United States Patent [19]
Kelly

[11] 3,830,520
[45] Aug. 20, 1974

[54] COMBINED MUD FLAP AND STABILIZER THEREFOR

[76] Inventor: John J. Kelly, 616 7th St., S.E., Sidney, Mont. 59270

[22] Filed: Feb. 2, 1973

[21] Appl. No.: 328,897

[52] U.S. Cl. ........................................ 280/154.5 R
[51] Int. Cl. ........................................ B62d 25/16
[58] Field of Search ........................... 280/154.5 R

[56] References Cited
UNITED STATES PATENTS

| | | | |
|---|---|---|---|
| 3,089,712 | 5/1963 | Kosik | 280/154.5 R |
| 3,091,478 | 5/1963 | Ambli | 280/154.5 R |
| 3,319,976 | 5/1967 | Eckerman | 280/154.5 R |

Primary Examiner—Robert R. Song
Attorney, Agent, or Firm—Berman, Bishoff & Platt

[57] ABSTRACT

A combined mud flap and stabilizer therefor used to prevent mud and stones from being thrown from the tires of trucks into the path of other vehicles. The mud flap consists of a flexible generally rectangular panel suspended from a truck at the rear of or front of truck tires. The stabilizer consists of a flexible stranded steel cable having a general U-shape and secured to the flap at its upper ends and intermediate its upper and lower ends. The steel cable can be vertically adjusted on the flap to suit the flap for varying road conditions.

4 Claims, 4 Drawing Figures

PATENTED AUG 20 1974 3,830,520
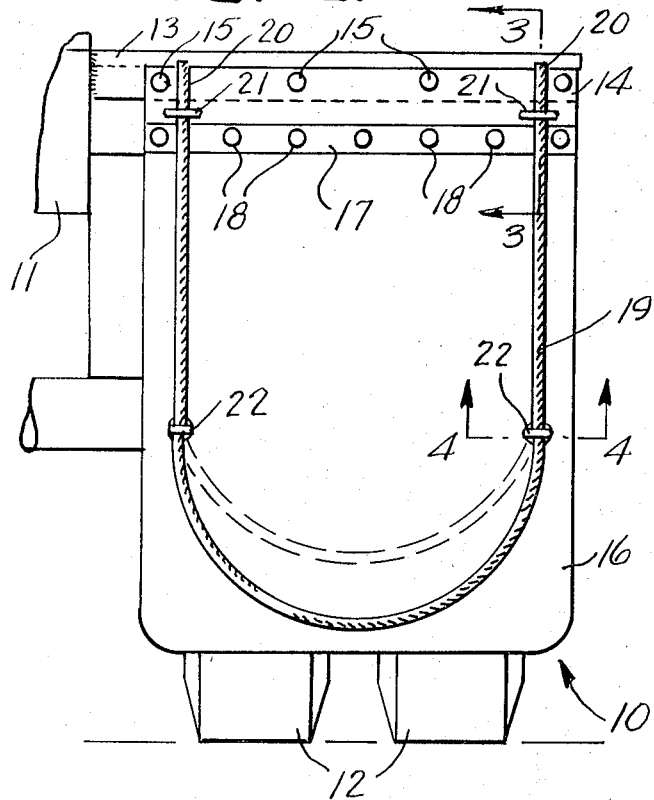
FIG. 1.
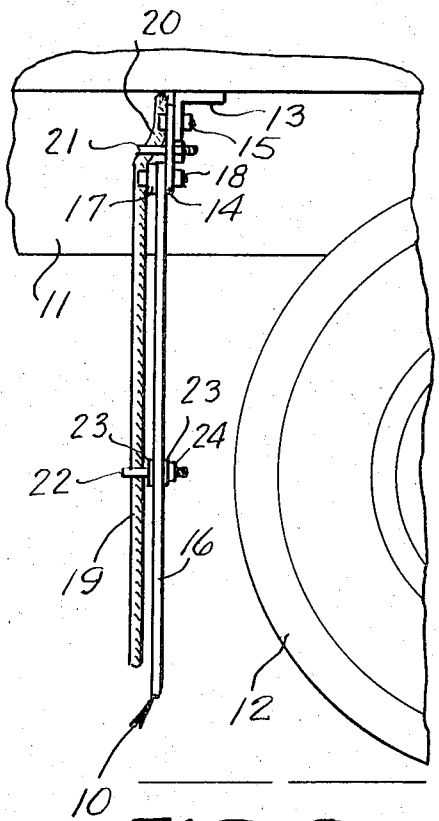
FIG. 2.
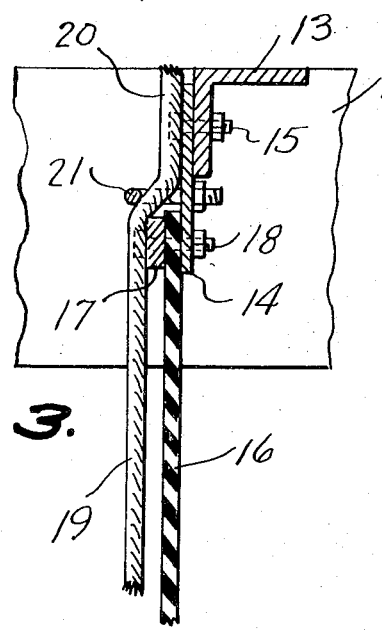
FIG. 3.
FIG. 4.

COMBINED MUD FLAP AND STABILIZER THEREFOR

BACKGROUND OF THE INVENTION

1. Field of the Invention

The present invention relates to combined mud flaps and stabilizers therefor normally used adjacent the wheels of trucks.

SUMMARY OF THE INVENTION

The combined mud flap and stabilizer of the instant invention includes a generally rectangular flexible panel secured in vertically extending relation to a truck immediately to the rear of or to the front of the truck wheels. A flexible stranded steel cable of generally U-form has its upper ends secured to the flap for vertical adjustment with respect to the flap. The cable is secured at its lower end portion to the flap in a manner to permit vertical movement of the cable with respect to the flap.

The primary object of the invention is to provide a combined mud flap and stabilizer therefor which will normally maintain the mud flap in its vertical operative position closely adjacent the wheel of a truck.

Other objects and advantages will become apparent from the following specification when considered in light of the attached drawings.

BRIEF DESCRIPTION OF THE DRAWINGS

FIG. 1 is a rear elevation of the invention shown attached to a truck adjacent the wheel thereof.

FIG. 2 is a side elevation of the invention.

FIG. 3 is an enlarged fragmentary vertical sectional view taken along line 3—3 of FIG. 1, looking in the direction of the arrows.

FIG. 4 is a fragmentary horizontal sectional view taken along line 4—4 of FIG. 1, looking in the direction of the arrows.

DESCRIPTION OF THE PREFERRED EMBODIMENT

Referring now to the drawings in detail wherein like reference characters indicate like parts throughout the several figures, the reference numeral 10 indicates generally a combined mud flap and stabilizer therefor constructed in accordance with the invention.

The combined mud flap and stabilizer 10 is adapted for use with a truck shown fragmentarily at 11. The truck is conventionally supported on dual wheels 12 and is provided with a horizontally extending angle iron support 13 projecting outwardly from the truck 11, the same distance that the dual wheels 12 extend outwardly therefrom.

The combined mud flap and stabilizer 10 includes a generally rectangular steel plate 14 which is detachably secured to the support 13 by a plurality of bolts 15. The plate 14 is upright and extends below the support 13.

A generally rectangular flexible panel 16 formed of rubber or rubber like materials has its upper edge positioned against the lower edge of the plate 14 as can be clearly seen in FIG. 3. An elongate flat attachment bar 17 is engaged against the face of the upper edge of the panel 16 oppositely of the plate 14. A plurality of bolts 18 extend through the bar 17 and the plate 14 as well as the panel 16 to clamp the panel 16 tightly to the plate 14 along the upper edge of the panel 16.

A flexible stranded steel cable 19 of generally U-shaped configuration as seen in FIG. 1 is positioned on the side of the panel 16 opposite the dual wheels 12 and has its upper ends 20 secured to the plate 14 by a pair of U-bolts 21 which engage over the ends 20 of the cable 19 and project through the plate 14.

The cable 19 extends loosely through a pair of eye bolts 22. The eye bolts 22 extend through a pair of washers 23 on opposite sides of the panel 16 and are clamped to the panel 16 by a nut 24.

When it is desired to vertically adjust the cable 19 on the panel 16, the U-bolts 21 are loosened and the cable 19 is adjusted thereon slipping freely through the eye bolts 22, after which the U-bolts 21 are retightened to lock the cable 19 in its new position with respect to the panel 16.

In prior art unstabilized mud flaps, the flexible panel is often held in an inoperative horizontal position by the force of air as the truck moves at high speeds along the road. It has been nearly impossible to provide flexible mud flaps between adjacent dual wheels of a double dual wheel truck since the panel would be caught on one of the duals and flipped up so as to be resting on top of the duals out of position for service. Rod-like stabilizers, as found in the prior art, do not permit the flexibility of the present invention and additionally if forced on top of the tires could and would seriously damage the tires without the knowledge of the driver.

When backing into a stationary object, the stabilizer will move under the pressure but will immediately return to its original position when the pressure is removed without damage or injury to the mud flap. The adjustability of the stabilizer on the panel permits the cable to be set at a distance of 2 inches above the bottom edge of the panel for regular highway driving or at a distance of 6 inches thereabove on back road driving with hazards of mud, snow or gravel. The size of the cable used with the mud flap will vary in accordance with the flexibility of the mud flap and the size of the truck with which the mud flap is used. From a practical standpoint, a cable of as small as one-quarter inch for light trucks to as large as five-eighths of an inch on heavy trucks has been found effective.

It has been found that the stabilizer of the instant invention increases the life of the mud flap. The method of installation of the stabilizer is optional with the purchaser.

Having thus described the preferred embodiment of the invention, it should be understood that numerous structural modifications and adaptations may be resorted to without departing from the spirit and scope of the invention.

What is claimed is:

1. A combined mud flap and stabilizer therefor comprising a flexible flat panel adapted to be vertically suspended adjacent the wheels of a truck, a flexible stranded steel cable, means securing the opposite ends of said cable to said panel with said cable in a generally U-shape, said means including a flat plate removably secured to the upper edge of said panel and extending upwardly therefrom, and a pair of U-bolts clamping the opposite ends of said cable to said plate, and means for loosely securing the lower end portion of said cable to said panel, said cable being vertically adjustable in said U-bolts and in the means for loosely securing the lower end portion of said cable to said panel.

2. A device as claimed in claim 1 wherein the means for loosely securing the lower end portion of said cable to said panel comprises an eye bolt secured to said panel with the lower end portion of said cable loosely extending through the eye of said eye bolt.

3. A combined mud flap and stabilizer therefor comprising a flexible flat panel adapted to be vertically suspended adjacent the wheels of a truck on a vertical portion of a support, a flexible stranded steel cable arranged in U-shape with two vertical legs connected by a lower bight portion, said cable being secured to said panel by a flat plate removably secured to the upper edge of said panel and extending upwardly therefrom, and by releasable clamping means securing the upper, opposite ends of said cable to said plate, a flat bar disposed between the U-shaped cable and the flexible flat panel just below said clamping means in such manner that the ends of the cable are bent across the bar and the cable extends downwardly generally parallel to the flexible panel, said cable being vertically adjustable in said releasable clamping means, and means for loosely securing the lower bight portion of said cable to said panel while permitting vertical adjustment in said releasable clamping means.

4. A device as claimed in claim 3, wherein said releasable clamping means comprises a pair of U-bolts and said means for loosely securing the lower bight portion of said cable to said panel comprises a pair of eye bolts secured to the panel and each having its eye loosely disposed about one leg of the U-shaped cable near the bottom thereof and at the top of the bight portion of the cable.

* * * * *